United States Patent
Ueno et al.

(10) Patent No.: US 10,050,543 B2
(45) Date of Patent: Aug. 14, 2018

(54) SWITCHING POWER SUPPLY DEVICE CHANGING OUTPUT VOLTAGE SETTING AND INTEGRATED CIRCUIT FOR SWITCHING POWER SUPPLY DEVICE

(71) Applicant: SANKEN ELECTRIC CO., LTD., Niiza-shi, Saitama (JP)

(72) Inventors: Masao Ueno, Tokyo (JP); Mitsutomo Yoshinaga, Koshigaya (JP); Mitsugu Furuya, Kawagoe (JP); Takashi Matsumoto, Asaka (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 0 days.

(21) Appl. No.: 15/539,354

(22) PCT Filed: Oct. 30, 2015

(86) PCT No.: PCT/JP2015/080682
§ 371 (c)(1),
(2) Date: Jun. 23, 2017

(87) PCT Pub. No.: WO2017/072940
PCT Pub. Date: May 4, 2017

(65) Prior Publication Data
US 2017/0358994 A1 Dec. 14, 2017

(51) Int. Cl.
*H02M 3/335* (2006.01)
*H02M 1/10* (2006.01)
(Continued)

(52) U.S. Cl.
CPC ......... *H02M 3/33561* (2013.01); *H02M 1/10* (2013.01); *H02M 1/088* (2013.01);
(Continued)

(58) Field of Classification Search
CPC ............... H02M 3/33561; H02M 1/10; H02M 2001/019; H02M 2001/322;
(Continued)

(56) References Cited

U.S. PATENT DOCUMENTS 6,002,597 A * 12/1999 Rozman ............ H02M 3/33592
363/127
6,181,579 B1 * 1/2001 Nagai ............... H02M 3/33592
363/21.06
(Continued)

FOREIGN PATENT DOCUMENTS

JP 2015-043643 A 3/2015

*Primary Examiner* — Gustavo Rosario Benitez
(74) *Attorney, Agent, or Firm* — Metrolexis Law Group PLLC

(57) ABSTRACT

A switching power supply device that switches setting of an output voltage based on an external signal according to one or more embodiments includes: a transformer including a primary winding and n secondary windings; n synchronous rectification elements provided, corresponding to the n secondary windings; and n−1 switch elements that switch the secondary windings. Each of the n−1 switch elements is kept on or off according to a high or low voltage value out of set voltages of the output voltage, and all or any of the n synchronous rectification elements are selected to synchronously rectify pulse voltage of the secondary windings, and when operation with a high set value of the output voltage stops, a synchronous rectification element used to output the high set value performs switching operation until the output voltage goes down to the low voltage value of the set voltages of the output voltage.

11 Claims, 9 Drawing Sheets

(51) Int. Cl.
  *H02M 1/088*  (2006.01)
  *H02M 1/32*  (2007.01)
(52) U.S. Cl.
  CPC .... *H02M 3/33569* (2013.01); *H02M 3/33592* (2013.01); *H02M 2001/322* (2013.01)
(58) Field of Classification Search
  CPC ......... H02M 2001/4283; H02M 1/088; H02M 3/24; H02M 3/335; H02M 3/33507; H02M 3/33523; H02M 3/33569; H02M 3/33576; H02M 3/33592; H02M 7/125; Y02B 70/1475
  See application file for complete search history.

(56) References Cited

U.S. PATENT DOCUMENTS

| | | | | |
|---|---|---|---|---|
| 2009/0016083 | A1* | 1/2009 | Soldano | H02M 3/33592 363/20 |
| 2010/0188871 | A1* | 7/2010 | Kim | H02M 3/33592 363/21.03 |
| 2012/0063175 | A1* | 3/2012 | Wang | H02M 3/33592 363/21.14 |
| 2013/0107582 | A1* | 5/2013 | Sato | H02M 3/33592 363/21.06 |
| 2014/0119063 | A1* | 5/2014 | Tseng | H02M 1/36 363/21.05 |

* cited by examiner

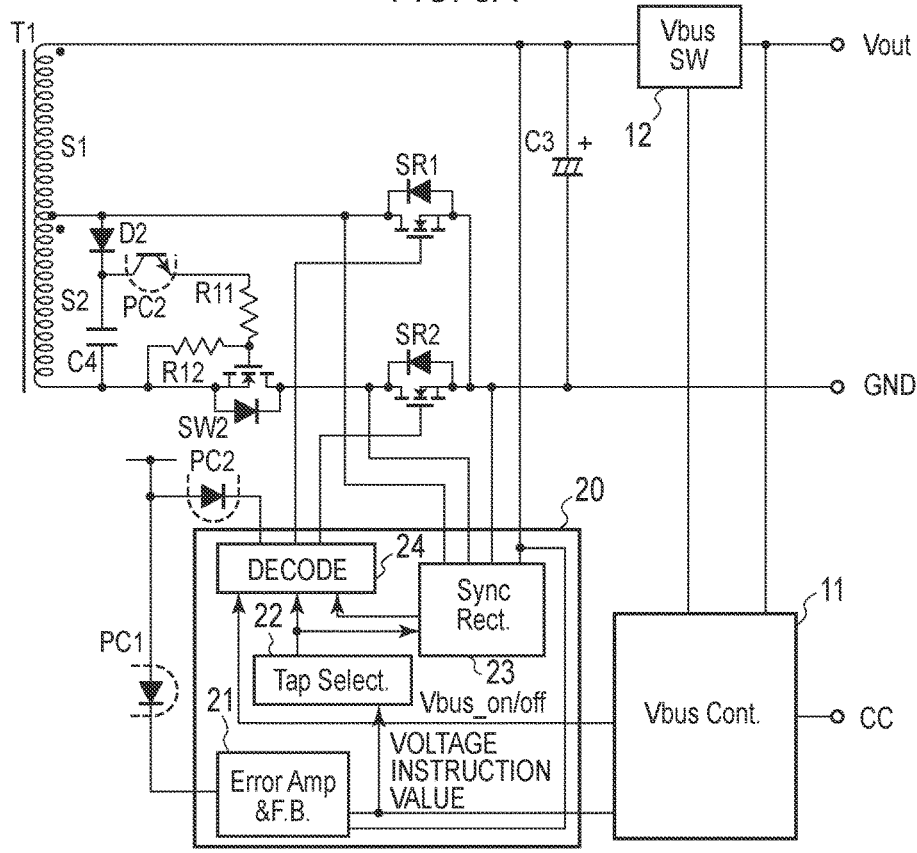

| Vbus_on/off | VOLTAGE INSTRUCTION VALUE | Tap Select. | Sync Rect. | Decode | | | |
|---|---|---|---|---|---|---|---|
| | | | | PC2 | SW2 | SR2 | SR1 |
| on | Low (5V) | off | off | off | off | off | off |
| | | | on | | | off | on |
| | High (20V) | on | off | on | on | off | off |
| | | | on | | | on | off |
| off | High→Low | on | — | on | on | ※ | off |
| | Low(5V CONTROL) | on | — | on | off | off | off |

※ SWITCHING

SWITCHING POWER SUPPLY DEVICE CHANGING OUTPUT VOLTAGE SETTING AND INTEGRATED CIRCUIT FOR SWITCHING POWER SUPPLY DEVICE

TECHNICAL FIELD

The invention relates to an AC adapter and a switching power supply device used for various electronic devices, and particularly relates to a power supply device supporting USB-PD (Universal Serial Bus-Power Delivery).

BACKGROUND ART

Since many electronic devices operating with direct current power operate at voltage of 3.3 V to 24 V, AC adapters, for example, have output voltages such as 5 V, 12 V, 19 V, and 24V. It is desirable that commercial transformers as well as transformers for switching power supplies have the optimum turn ratios suitable for their output voltages according to the principle of transformers which perform output voltage conversion based on the turn ratio. Accordingly, to design a power supply capable of varying an output voltage by two to three times (for example, a constant-current power supply), it is necessary to design the transformer and consider the withstand voltage of a primary side switching element and the withstand voltage of a secondary side switch element according to the maximum output voltage. This indicates that it is very difficult to design a single power supply or AC adapter capable of supporting devices having various operating voltages alone.

For this reason, in Japanese Patent Application Publication No. 2015-43643, a method of further providing a DC/DC converter, such as a step-down chopper regulator, at the DC output of an AC/DC power supply is used to configure a power supply capable of varying the output voltage largely.

CITATION LIST

Patent Literature

Patent Literature 1: Japanese Patent Application Publication No. 2015-43643

SUMMARY OF INVENTION

Technical Problem

The circuit configuration proposed in Patent Literature 1 has an AC/DC converter section and a DC/DC converter section as illustrated in FIG. 8 and switches N1, N2, and N3, which are switches, to suppress a decrease in the efficiency of the DC/DC converter section.

Meanwhile, as illustrated in FIG. 9, there is an idea of employing a synchronous rectification method (M1, M2) to improve the rectification efficiency of an AC/DC converter section.

However, it is impossible to improve the efficiency of a configuration having the AC/DC converter section and the DC/DC converter section as illustrated in FIG. 8, because the efficiency of a power supply device is a value obtained by multiplying the efficiencies of the converters together, and accordingly is lower than any of the values of the AC/DC converter section and the DC/DC converter section. The configuration also increases the parts count and prevents downsizing, which is also not preferable.

Meanwhile, by employing the synchronous rectification method at the AC/DC converter section as illustrated in FIG. 9, it is possible to improve the efficiency by an amount according to a loss occurring at the rectification diodes. However, since the efficiency is not optimized according to the turn ratio of the transformer when the output voltage is switched to another voltage, the efficiency cannot be improved when the other output voltage is selected because the switching duty greatly differs.

In view of the above problems, an object of the invention is to provide a switching power supply device capable of keeping high efficiency even when the output voltage is switched.

Solution to Problem

To solve the above problems, according to an aspect of the invention, a switching power supply device that switches setting of an output voltage based on an external signal is characterized in that the switching power supply device includes:

a transformer including a primary winding and n secondary windings;

n synchronous rectification elements, corresponding to the n secondary windings, at a secondary-side rectification portion that rectifies pulse voltage of the secondary windings;

n−1 switch elements that switch the secondary windings; and a control circuit that performs on-off control of the synchronous rectification elements, and keeps the switch elements on or off, in which each of the n−1 switch elements is kept on or off according to a high voltage value or a low voltage value set as the output voltage, and all or some of the n synchronous rectification elements are selected to synchronously rectify the pulse voltage of the secondary windings, and when operation with a high set value of the output voltage stops, a synchronous rectification element used to output the high set value of the output voltage among the synchronous rectification elements performs switching operation until the output voltage goes down to the low voltage value of set voltages of the output voltage.

Advantageous Effects of Invention

According to the invention, a synchronous rectification element for each of the secondary windings is provided, and it is possible to select a tap of the transformer depending on a set output voltage via switch elements. Accordingly, even when the output voltage is changed, it is possible to obtain high efficiency for any output voltage by changing the connection of the secondary windings of the transformer. In addition, since the residual voltage of the smoothing capacitor can be discharged via a synchronous rectification element of the synchronous rectification circuit, there is no need to include additional dedicated parts for a discharge circuit. Further, including the discharge function gives the switching power supply device a protection function, which prevents a voltage exceeding a set voltage from being outputted at the output terminal even when the output voltage setting is changed from a high voltage setting to a low voltage setting immediately afterwards.

BRIEF DESCRIPTION OF DRAWINGS

FIG. 3A illustrates a circuit diagram illustrating the first embodiment of the invention and FIG. 3B illustrates an operation table of several portions therein.

DESCRIPTION OF EMBODIMENTS

First Embodiment

Figure 1:
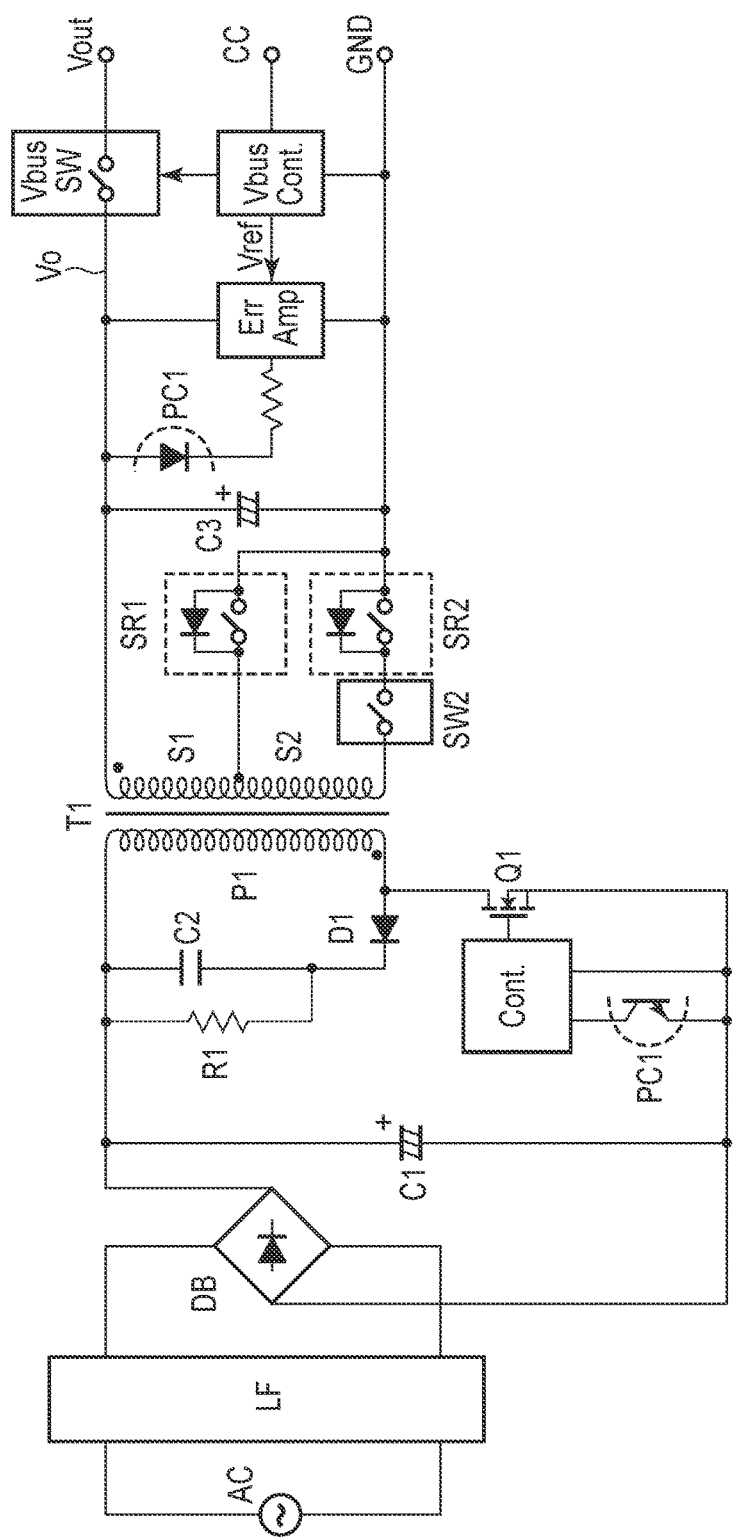
FIG. 1 is a diagram illustrating a block diagram according to a first embodiment of the invention.

FIG. 1 is a diagram illustrating a block diagram according to a first embodiment of the invention.

In the basic configuration illustrated in FIG. 1, an alternating current input from power supply AC through line filter LF connected to the power supply is rectified to a direct current voltage with rectifier DB, and the direct current voltage smoothed with capacitor C1 is connected to a series circuit of primary winding P1 of transformer T1 and MOSFET Q1. Connected to the gate of MOSFET Q1 is control circuit cont., which performs on-off control of MOSFET Q1 based on a feedback signal from photocoupler PC1 described later to control output voltage Vo. Diode D1, capacitor C2, and resistor R1 make up a snubber circuit, which absorbs surge voltages applied to MOSFET Q1.

Secondary windings S1 and S2 of transformer T1 are connected in series. One terminal of secondary winding S1 is connected to the positive electrode of smoothing capacitor C3 and connected to the positive electrode of output (Vout) via Vbus switch VbusSW. The negative electrode of smoothing capacitor C3 is connected to GND of the output and one terminal of each of synchronous rectifying elements SR1 and SR2. The other terminal of synchronous rectification element SR1 is connected to a tap between secondary windings S1 and S2 connected in series. The other terminal of synchronous rectification element SR2 is connected to the other terminal of secondary winding S2 via switch element SW2. Connected between both terminals of smoothing capacitor C3 are photocoupler PC1 and error amplifier ErrAmp, which perform a feedback control on control circuit cont. on the primary side via photocoupler PC1 based on voltage instruction value Vref signal from Vbus controller Vbuscont. such that output voltage Vo is a constant value.

Synchronous rectification elements SR1 and SR2 turn off and on complementarily to the on-off operation of MOSFET Q1 to rectify the voltage generated at secondary windings S1 and S2.

Switch SW2 is kept on or off according to High or Low of the setting voltage of output voltage Vo. When switch SW2 is on, synchronous rectification element SR2 performs synchronous rectification operation.

Terminals of Vout, GND, and cc of the output are integrated in connector terminals of USB-PD, and are connected to or disconnected from loads via connectors. Here, depending on whether a cc terminal signal is present or not, Vbus controller Vbus cont. determines whether the connector is connected.

Figure 2:
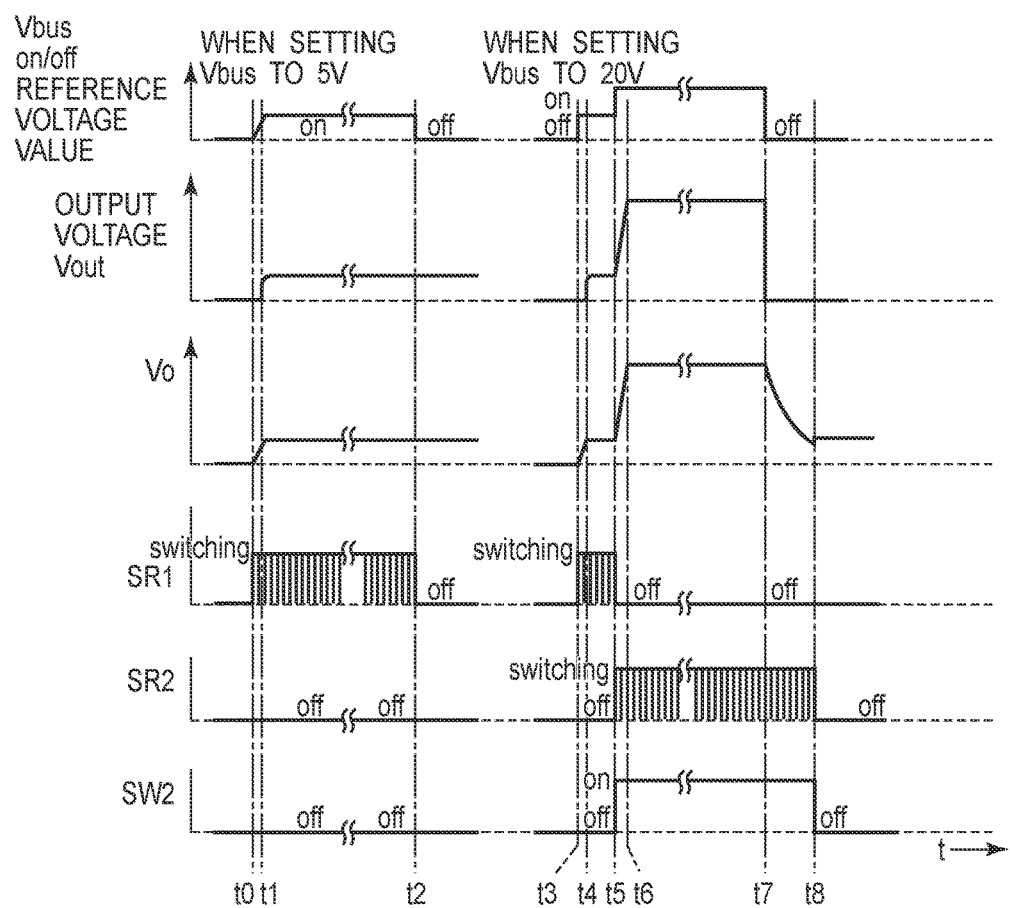
FIG. 2 is a diagram illustrating sequences of several portions in the block diagram illustrated in FIG. 1.

FIG. 2 illustrates sequences of several portions in the block diagram illustrated in FIG. 1. FIG. 2 illustrates an example of a condition where the output voltage is set to any of 5 V and 20 V.

Here, in the specification, voltage instruction value Vref signal from Vbus controller Vbus cont. first activates the output voltage at 5 V, and after stabilizing it, sets again output voltage Vo to 20 V.

First, descriptions are provided for the case of setting output voltage Vout to 5 V. At time t0, MOSFET Q1 starts switching operation. In time with the switching operation of MOSFET Q1, synchronous rectification element SR1 on the secondary side starts on-off operation in synchronization with secondary winding S1 current. Here, switch SW2 and synchronous rectification element SR2 remain off from time t0. This makes a path of secondary winding S1→smoothing capacitor C3→synchronous rectification element SR1→secondary winding S1, through which rectification and smoothing are performed with smoothing capacitor C3 to output 5 V as output voltage Vo. Vbus switch turns on at time t1, and 5 V is outputted at Vout.

Next, when the USB-PD connector is disconnected at time t2, the cc terminal signal disappears. Vbus controller Vbus cont. sets voltage instruction value Vref signal to Low (5 V setting) and at the same time turns off Vbus switch. This makes output voltage at Vout zero. Here, when output voltage Vo is set to 5 V, it remains at 5 V, and synchronous rectification element SR1 stops synchronous rectification operation because the output has no load. Note that switch SW2 and synchronous rectification element SR2 remain off.

Although not illustrated, if the USB-PD connector is then connected again, Vbus switch turns on based on an instruction from the Vbus controller, and 5 V is outputted at Vout.

Next, descriptions are provided for the case where output voltage Vout is set to 20 V. At time t3, MOSFET Q1 starts switching operation. In time with the switching operation of MOSFET Q1, synchronous rectification element SR1 starts on-off operation in synchronization with secondary winding S1 current. Here, switch SW2 and synchronous rectification element SR2 remain off from time t3. This makes a path of secondary winding S1→smoothing capacitor C3→synchronous rectification element SR1→secondary winding S1, through which rectification and smoothing are performed with smoothing capacitor C3 to output 5 V as output voltage Vo. Vbus switch turns on at time t4, and 5 V is outputted at Vout. At time t5, voltage instruction value Vref signal from Vbus controller Vbus. cont causes setting again from 5 V as Low to 20 V as High. Along with this, switch SW2 is kept on, and synchronous rectification element SR2 starts on-off operation in synchronization with secondary windings S1 and S2 current. This raises output voltage Vo to 20 V at time t6, and 20 V is outputted at Vout via the Vbus switch.

When the USB-PD connector is disconnected at time t7, cc terminal signal disappears, and Vbus controller outputs Low (5 V setting) as voltage instruction value Vref signal changing from High (20 V setting), and at the same time turns off Vbus switch. This makes the output voltage at Vout zero. Here, since smoothing capacitor C3 is charged at 20 V, until the charged voltage goes down to 5 V, the error amplifier transmits a feedback signal to stop switching of MOSFET Q1 to primary-side control circuit Cont. via photocoupler PC1. At this time, by switching synchronous rectification element SR2 with switch element SW2 remaining on, the charged voltage of smoothing capacitor C3 is discharged into the snubber circuit on the primary side via secondary windings S1 and S2, and primary winding P1 of transformer T1.

When detecting that the charged voltage of smoothing capacitor C3 goes down below 5 V at time t8, Vbus controller turns switch element SW2 from on to off and stops the switching operation of synchronous rectification element SR2. At the same time, the error amplifier causes primary-side control circuit Cont. via photocoupler PC1 to start the switching operation of MOSFET Q1 and perform control such that output voltage Vo is 5 V.

Descriptions are provided in detail as below using FIG. 3A and FIG. 3B for a specific circuit configuration for the secondary side of a direct current power supply device configured as the first embodiment. FIG. 3A illustrates a circuit diagram of the first embodiment of the invention; FIG. 3B illustrates an operation table of several portions therein.

In FIG. 3A, the same reference signs are used for the same parts as illustrated in FIG. 1. Comparing to FIG. 1, synchronous rectification controller 20, diode D2, capacitor C4, and resistors R11 and R12 are added. Note that switch SW2 and secondary-side synchronous rectification elements SR1 and SR2 are replaced with N-MOSFETs. Vbus controller 11 receives external signal cc, and based on external signal cc, transmits a signal to perform on-off control of Vbus switch 12 to Vbus switch 12 and synchronous rectification controller 20. In addition, Vbus controller 11 transmits voltage instruction value Vref to synchronous rectification controller 20.

Synchronous rectification controller 20 includes error amplifier 21, tap selector 22, synchronous rectification detector 23, and decoder 24. Error amplifier 21 compares output voltage Vout and voltage instruction value Vref, amplifies the error signal thereof, and gives feedback to control IC on the primary side via photocoupler PC1.

Depending on the voltage instruction value from Vbus controller 11, tap selector 22 sends to decoder 24, an instruction to keep switch element SW2 on or off, and to synchronous rectification detector 23, an instruction to start/stop the operation of synchronous rectification elements SR1 and SR2. Decoder 24 detects an on/off signal from Vbus controller, a signal from the tap selector, a signal from the synchronous rectification detector, and output voltage Vo, and sends out an on or off signal to photocoupler PC2, switch element SW2, and synchronous rectification elements SR1 and SR2. FIG. 3B illustrates an operation table based on the on/off signal of Vbus switch and voltage instruction values from Vbus controller 11.

When an off signal for Vbus switch is transmitted from Vbus controller 11, and the voltage instruction value is switched from High to Low, decoder 24 keeps switch element SW2 on and causes synchronous rectification element SR2 to perform switching operation until output voltage Vo goes down from 20 V to 5 V, and stops the operation when output voltage Vo reaches 5 V. Turning switch element SW2 on and stopping the switching operation of synchronous rectification element SR2 can be done by monitoring the voltage of output voltage Vo. However, in order to keep a margin at switching, those may be switched after letting output voltage Vo go down below 5 V.

When causing synchronous rectification element SR2 to perform switching operation, it is possible by adjusting the on-duty to adjust a discharge time constant of residual voltage of smoothing capacitor C3. A larger on-duty makes the discharge time constant earlier, and a smaller on-duty makes it slower. In addition, since the on-duty is proportional to the peak value of the current flowing through synchronous rectification element SR2, it is possible to make the current peak value smaller if desired by making the on-duty smaller.

Note that synchronous rectification controller 20 may be configured with an integrated circuit.

In FIG. 3A and FIG. 3B, synchronous rectification elements SR1 and SR2 are connected to the GND side. However, there are some cases where a good result for switching noise can be obtained when synchronous rectification elements SR1 and SR2 are connected to the positive side. Here, FIG. 4A illustrates a modification example of connections of the first embodiment and FIG. 4B illustrates an operation table of several portions therein.

Figures 4A, 4B:
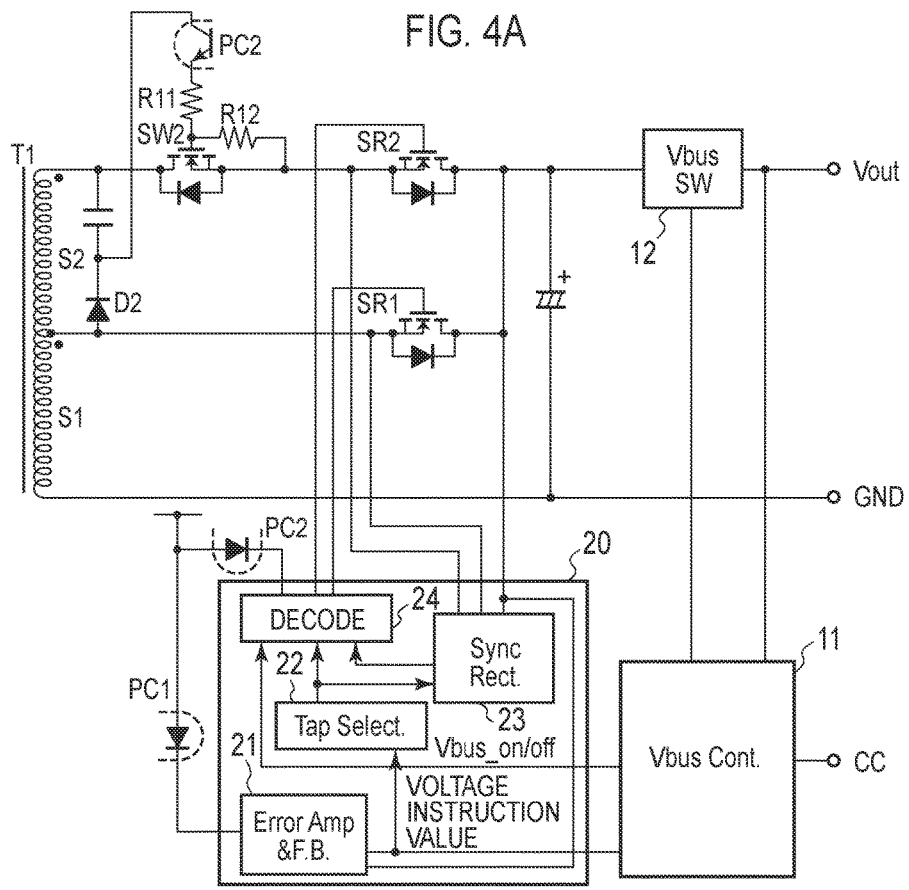
FIG. 4A illustrates an example of a connection modification on the circuit diagram illustrating the first embodiment of the invention and FIG. 4B illustrates an operation table of several portions therein.

In FIG. 4A, the connection positions of secondary windings S1 and S2 of transformer T1 are inverted in the up-down direction, and one terminal of secondary winding S1 is connected to the negative electrode of smoothing capacitor C3 and GND.

A tap to which the other terminal of secondary winding S1 and one terminal of secondary winding S2 of transformer T1 are connected, is connected to synchronous rectification element SR1, and connected to the positive electrode of smoothing capacitor C3 via synchronous rectification element SR1. The other terminal of secondary winding S2 is connected to switch element SW2 and synchronous rectification element SR2 in series and connected to the positive electrode of smoothing capacitor C3.

Note that synchronous rectification controller 20, Vbus controller, and Vbus switch have no change and the operation table illustrated in FIG. 4B is the same operation as in FIG. 3B.

Second Embodiment

The first embodiment of the invention illustrated a method of switching the output voltage using the secondary windings of transformer T1 connected only in series. When the secondary windings are connected in series, winding S2 for a high voltage of transformer T1 cannot be used for the case of setting the output voltage to Low. In this case, heat generated in secondary windings cannot be dispersed, and the window area that transformer windings have are squeezed and cannot be used effectively.

Here, if the proportion of the output voltages switched to Low/High is about two times, it is possible to utilize the secondary windings of transformer T1 effectively by switching the connection of secondary windings S1 and S2 between in series and in parallel. A second embodiment of the invention illustrates a method where secondary windings S1 and S2 of transformer T1 are connected in series and in parallel, and FIG. 5 illustrates a block diagram thereof.

Figure 5:
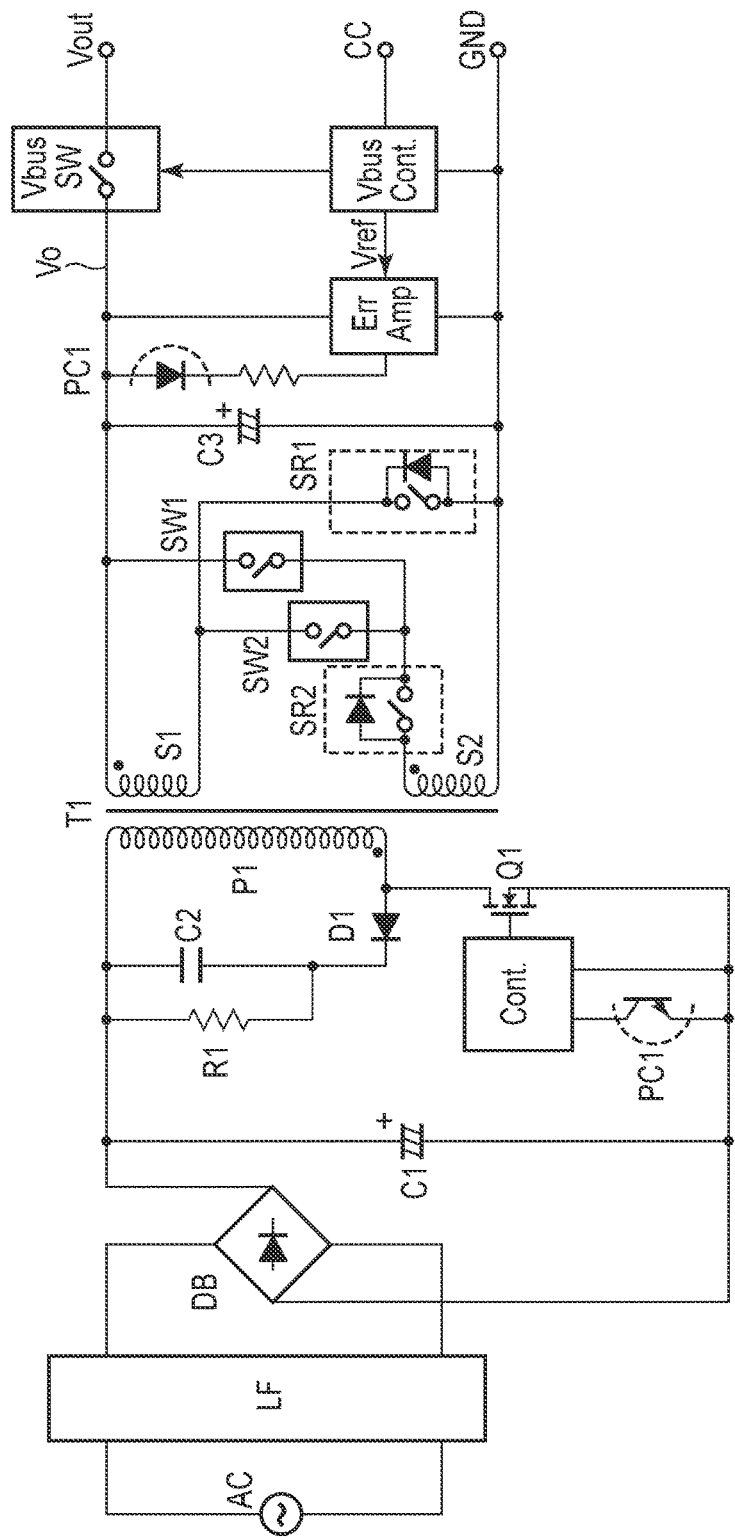
FIG. 5 is a diagram illustrating a block diagram according to a second embodiment of the invention.

FIG. 5 is different from FIG. 1 of the first embodiment in that secondary windings S1 and S2 of transformer T1 are separated and that secondary windings S1 and S2 are connected to each other via switch element SW2 and synchronous rectification element SR2. In addition, switch element SW1 is added, and connected between the positive electrode of smoothing capacitor C3 and the connection point between switch element SW2 and synchronous rectification element SR2. One terminal of secondary winding S1 of transformer T1 is connected to the positive electrode of smoothing capacitor C3; the other terminal is connected to switch element SW2 and connected to GND via synchronous rectification element SR1.

Figure 6:
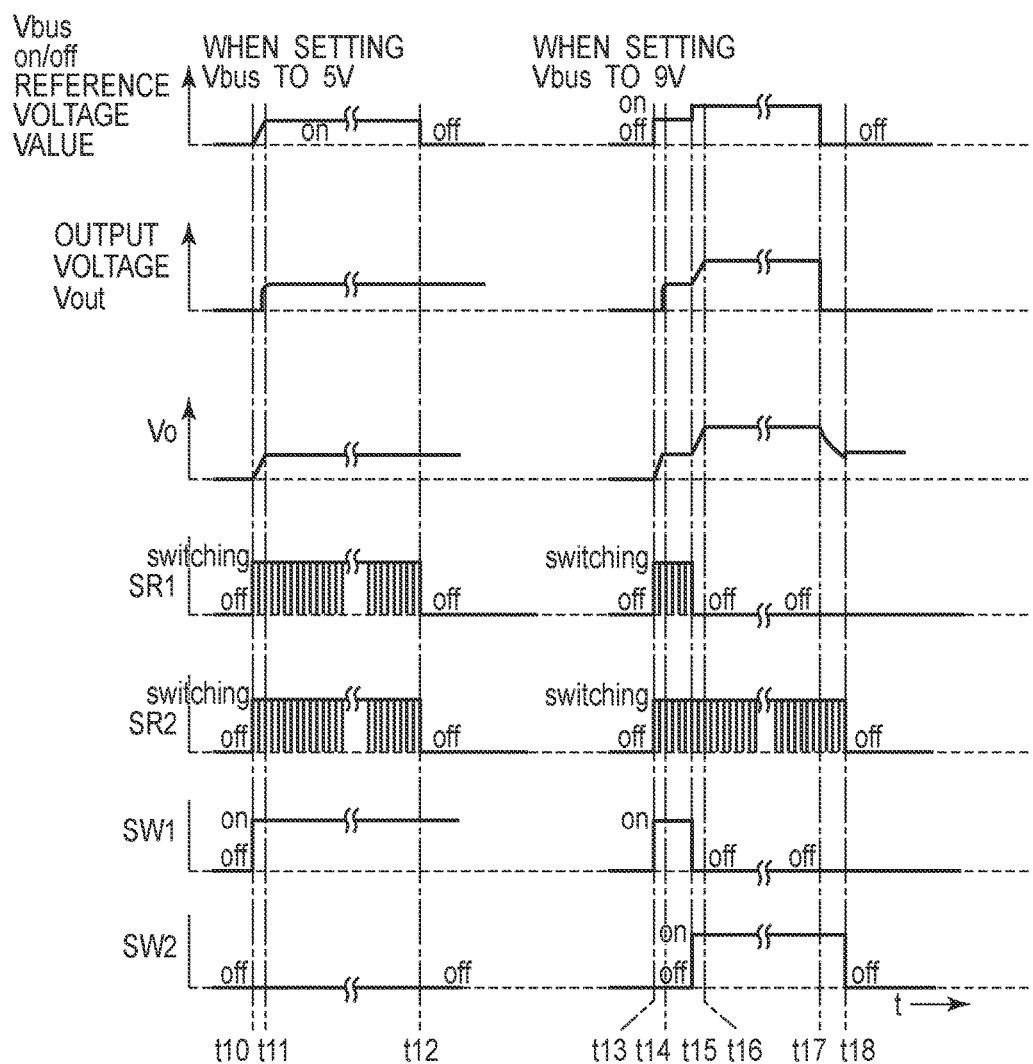
FIG. 6 is a diagram illustrating sequences of several portions in the block diagram illustrated in FIG. 5.

FIG. 6 illustrates sequences of several portions in the block diagram illustrated in FIG. 5. FIG. 6 illustrates an example of a condition where the output voltage is set to any of 5 V and 9 V which is about twice the 5 V.

Note that specification of Vbus controller is the same as that in the first embodiment.

First, descriptions are provided for the case of setting output voltage Vout to 5 V. At time t10, MOSFET Q1 starts switching operation. Switch element SW1 is kept on and switch element SW2 is kept off, and secondary windings S1 and S2 are connected in parallel via synchronous rectification elements SR1 and SR2. Complementarily to the switching operation of MOSFET Q1, synchronous rectification elements SR1 and SR2 start on-off operation in synchronization with secondary winding S1 current and S2 current.

Vbus switch turns on at time t11, and Vo voltage is outputted at Vout.

Next, when the USB-PD connector is disconnected at time t12, cc terminal signal disappears at Vbus controller, and Vbus controller turns off Vbus switch. This makes Vout output voltage zero. Here, when output voltage Vo is set to 5 V, 5 V continues to be kept. However, synchronous rectification elements SR1 and SR2 stop synchronous rectification operation because there is no load. Note that, although not illustrated, if the USB-PD connector is then connected again, Vbus switch turns on based on an instruction from Vbus controller and 5 V is outputted at Vout.

Next, descriptions are provided for the case where output voltage Vout is set to 9 V. At time t13, MOSFET Q1 starts switching operation. Note that switch element SW1 is on and switch element SW2 is off, and secondary windings S1 and S2 are connected to each other in parallel via synchronous rectification elements SR1 and SR2. In time with the switching operation of MOSFET Q1, secondary-side synchronous rectification elements SR1 and SR2 start on-off operation in synchronization with secondary winding S1 current and S2 current. This provides output voltage Vo of 5 V which is rectified and smoothed with smoothing capacitor C3. Next, Vbus switch turns on at time t14 and 5 V is outputted at Vout. At time t15, in response to cc signal not illustrated, voltage instruction value Vref signal from Vbus controller causes setting again from 5 V as Low to 9V as High. At the same time, according to voltage instruction value Vref signal from Vbus controller, switch element SW1 turns off from on, and the operation of synchronous rectification element SR1 stops. In addition, at the same time, switch element SW2 is switched on from off. This switches the connection of secondary windings S1 and S2 of transformer T1 to series connection.

Along with this, output voltage Vo rises to 9 V at time t16, and 9 V is outputted at Vout via Vbus switch.

When the USB-PD connector is disconnected at time t17, cc terminal signal disappears, and Vbus controller turns voltage instruction value Vref signal from High (9 V setting) to Low (5 V setting) and at the same time turns off Vbus switch. This makes Vout output voltage zero. Here, since smoothing capacitor C3 is charged at 9 V, until the charged voltage goes down to 5 V, the error amplifier transmits a feedback signal to stop switching of MOSFET Q1 to primary-side control circuit Cont. via photocoupler PC1. At this time, by switching synchronous rectification element SR2 with switch element SW2 remaining on, the residual voltage of smoothing capacitor C3 is discharged into the snubber circuit on the primary side via secondary windings S1 and S2 and primary winding P1 of transformer T1.

When detecting that the residual voltage of smoothing capacitor C3 goes down below 5 V at time t18, Vbus controller turns switch element SW2 off from on and stops the switching operation of synchronous rectification element SR2. At the same time, the error amplifier causes primary-side control circuit Cont. via photocoupler PC1 to start the switching operation of MOSFET Q1 and perform control such that output voltage Vo is 5 V.

Figure 7:
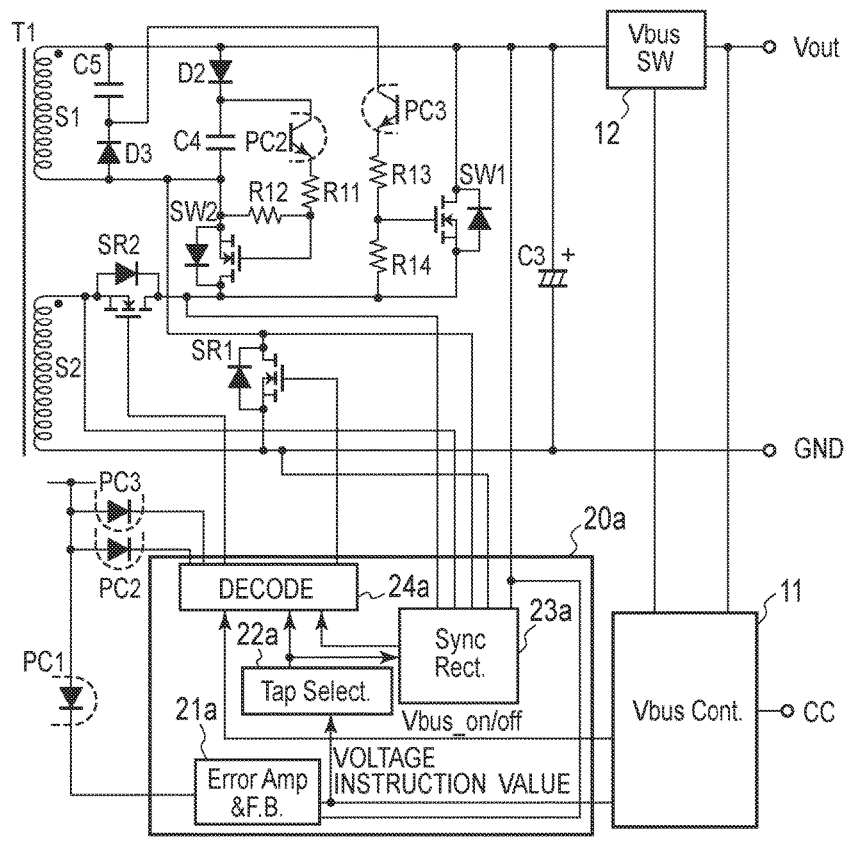
FIG. 7A illustrates a circuit diagram illustrating the second embodiment of the invention and FIG. 7B illustrates an operation table of several portions therein.
Figure 8:
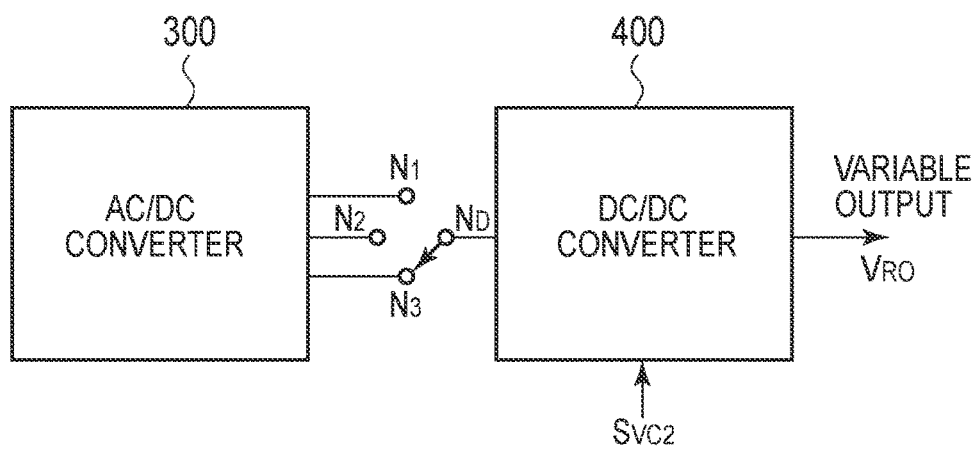
FIG. 8 illustrates a circuit diagram of a conventional configuration having an AC/DC converter section and a DC/DC converter section.
Figure 9:
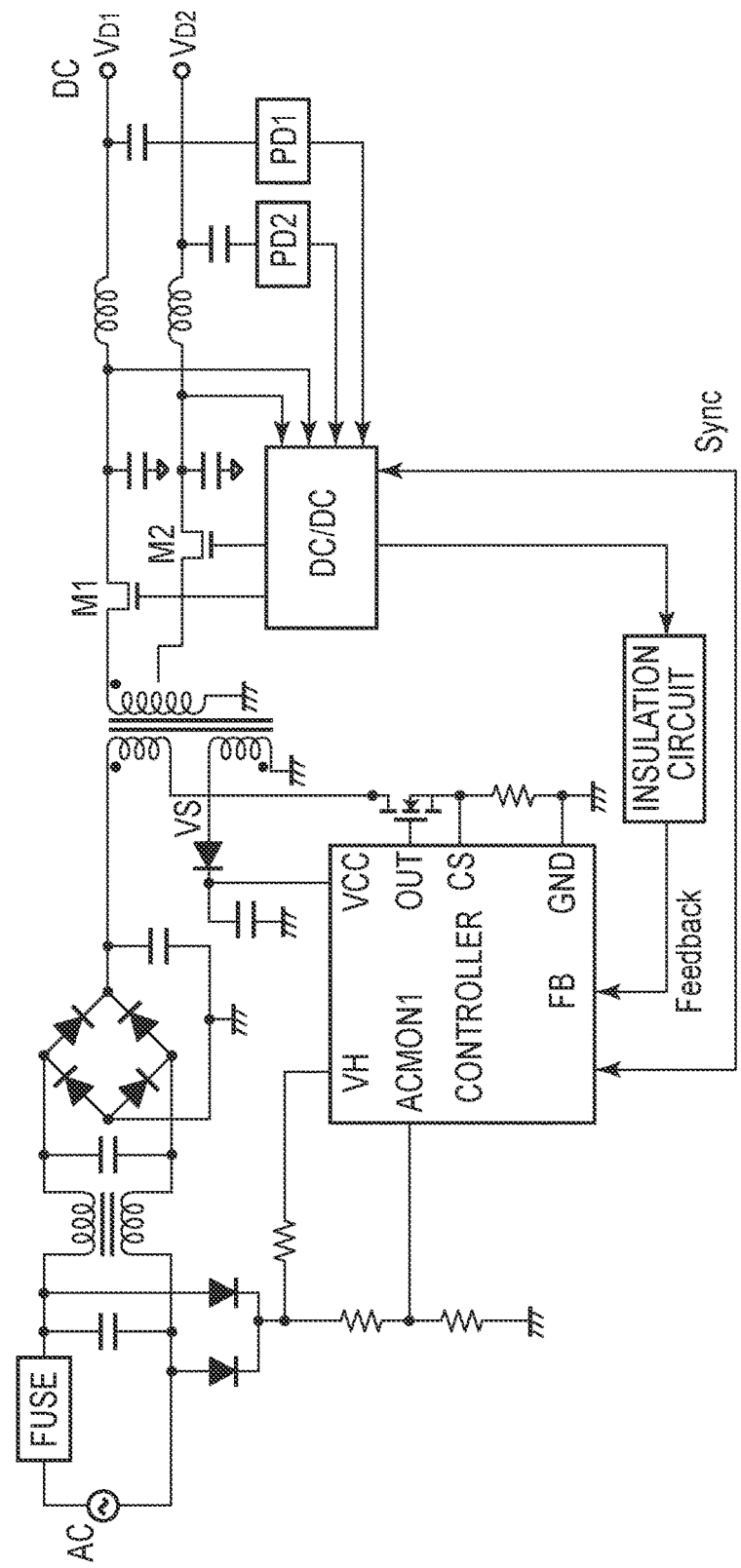
FIG. 9 illustrates an example circuit employing a synchronous rectification method at the AC/DC converter section of the conventional technique in FIG. 8.

Descriptions are provided in detail as below using FIG. 7A and FIG. 7B for a specific circuit configuration for the secondary side of a direct current power supply device configured as the second embodiment. FIG. 7A illustrates a circuit diagram of the second embodiment of the invention; FIG. 7B illustrates an operation table of several portions therein.

In FIG. 7A, the same reference signs are used for the same parts as illustrated in FIG. 6. Comparing to FIG. 6, synchronous rectification controller 20a, diodes D2 and D3, capacitors C4 and C5, resistors R11 to R14, and photocoupler PC3 are added. Note that switches SW1 and SW2, and secondary-side synchronous rectification elements SR1 and SR2 are replaced with N-MOSFETs.

Vbus controller 11 receives external signal cc, and based on external signal cc, transmits a signal to perform on-off control of Vbus switch 12 to Vbus switch 12 and synchronous rectification controller 20a. In addition, Vbus controller transmits voltage instruction value Vref to synchronous rectification controller 20a.

Synchronous rectification controller 20a includes error amplifier 21a, tap selector 22a, synchronous rectification detector 23a, and decoder 24a. Error amplifier 21a compares output voltage Vout and voltage instruction value Vref, amplifies the error signal thereof, and gives feedback to control IC on the primary side via photocoupler PC1.

Depending on the voltage instruction value from Vbus controller 11, tap selector 22a sends to decoder 24a, an instruction to keep switch element SW2 on or off, and to synchronous rectification detector 23a, an instruction to start/stop the operation of synchronous rectification elements SR1 and SR2. FIG. 7B illustrates an operation table based on the on/off signal of Vbus switch and voltage instruction values from Vbus controller 11.

When an off signal is transmitted from Vbus controller 11 to Vbus switch 12, and the voltage instruction value is switched from High to Low, Vbus controller 11 keeps switch element SW2 on and causes synchronous rectification element SR2 to perform switching operation until the output voltage goes down to 5 V, and stops the operation when the output voltage reaches 5 V. Turning switch element SW2 on and stopping the switching operation of synchronous rectification element SR2 can be done by monitoring the voltage of output voltage Vo. However, in order to keep a margin at switching, those may be switched after letting output voltage Vo go down below 5 V.

When causing synchronous rectification element SR2 to perform switching operation, it is possible by adjusting the on-duty to adjust a discharge time constant of residual voltage of smoothing capacitor C3, and if it is desired to make small the peak value of the current flowing through synchronous rectification element SR2, it is possible to do so by making the on-duty small, which is the same as in the first embodiment.

Note that synchronous rectification controller 20a may be configured with an integrated circuit.

Although descriptions have been provided for the embodiments of the invention, the above embodiments are illustrated as examples to embody the technical spirit of the invention and are not intended to specify each configuration, combination, and the like described above. The invention may be applied making various modifications without departing from the gist thereof.

For example, although N-MOSFETs are used for synchronous rectification elements SR1 and SR2, combinations of a Schottky barrier diode and a wide gap semiconductor such as GaN may be used for the configuration.

Further, in the first embodiment, the number of secondary windings may be increased to n, and the number of synchronous rectification elements and the number of switch elements may be increased to n and n−1, respectively. In this case, to switch output voltage Vo between n voltages, setting may be made by combining some of n secondary windings depending on the output voltage. Note that n is a natural number 2, 3, 4 and so on. Also in the case where the number of secondary windings is increased to n, when an off signal is transmitted from Vbus controller 11 to Vbus switch 12, and the voltage instruction value is switched from High (n-th) to Low, Vbus controller 11 keeps switch element (n-th) on and causes synchronous rectification element (n-th) to perform switching operation until the output voltage goes down to a voltage set as Low, and stops the operation when the output voltage reaches the voltage set as Low.

INDUSTRIAL APPLICABILITY

As described above, a direct current power supply device according to the invention is suitable for a power supply device that switches between predetermined set voltages. Accordingly, it can be used for a power supply device for USB-PD using this, or the like.

REFERENCE SIGNS LIST

AC alternate current power supply
LF line filter
T1 transformer
11 Vbus controller
12 Vbus switch
20, 20a synchronous rectification controller
21, 21a error amplifier
22, 22a tap selector
23, 23a synchronous rectification detector
24, 24a decoder
C1 to C5 capacitor
D1 to D3 diode
DB rectifier
PC1 to PC3 photocoupler
Q1 MOSFET
R1, R11 to R14 resistor
Cont1. control circuit
SW1, SW2 switch element
SR1, SR2 synchronous rectification element

The invention claimed is:

1. A switching power supply device that switches setting of an output voltage of an output terminal based on an external signal, comprising:
   a transformer including a primary winding and n secondary windings;
   n synchronous rectification elements provided, corresponding to the n secondary windings, at a secondary-side rectification portion that rectifies pulse voltage of the secondary windings;
   n−1 switch elements that switch the secondary windings; and
   a control circuit that performs on-off control of the n synchronous rectification elements, and keeps the switch elements on or off, wherein
   n is a positive integer value of 2 or greater,
   each of the n−1 switch elements is kept on or off according to a high voltage value or a low voltage value out of set voltages of the output voltage, and all or any of the n synchronous rectification elements are selected to synchronously rectify the pulse voltage of the secondary windings, and
   when operation with a high set value of the output voltage stops, a synchronous rectification element used to output the high set value of the output voltage among the n synchronous rectification elements performs switching operation according to an adjusted on-duty to adjust a discharge time constant of a residual voltage of a smoothing capacitor coupled to the output terminal until the output voltage goes down to the low voltage value of the set voltages of the output voltage, the adjusted on-duty adjusted such that a larger value of the adjusted on-duty causes the discharge time constant to be smaller, and a smaller value of the adjusted on-duty causes the discharge time constant to be longer.

2. An integrated circuit for a switching power supply device that controls a switching power supply device that switches setting of an output voltage of an output terminal based on an external signal, the switching power supply device comprising:
   a transformer including a primary winding and n secondary windings;
   n synchronous rectification elements provided, corresponding to the n secondary windings, at a secondary-side rectification portion that rectifies pulse voltage of the secondary windings; and
   n−1 switch elements that switch the secondary windings, wherein
   n is a positive integer value of 2 or greater,
   the integrated circuit performs control such that
   each of the n−1 switch elements is kept on or off according to a high voltage value or a low voltage value out of set voltages of the output voltage, and all or any of the n synchronous rectification elements are selected to synchronously rectify the pulse voltage of the secondary windings, and
   when operation with a high set value of the output voltage stops, a synchronous rectification element used to output the high set value of the output voltage among the n synchronous rectification elements performs switching operation according to an adjusted on-duty to adjust a discharge time constant of a residual voltage of a smoothing capacitor coupled to the output terminal until the output voltage goes down to the low voltage value of the set voltages of the output voltage, the adjusted on-duty adjusted such that a larger value of the adjusted on-duty causes the discharge time constant to be smaller, and a smaller value of the adjusted on-duty causes the discharge time constant to be longer.

3. An integrated circuit for controlling an output voltage of a switching power supply based on an external signal, the switching power supply comprising:
   a direct current rectifier section capable of being coupled to an alternating current power supply;
   a transformer including a primary winding and secondary windings magnetically connected to the primary winding;

a first switching element, the primary winding of the transformer and the first switching element being connected to the direct current rectification section in series;
a first control circuit that controls on and off of the first switching element;
a ground terminal on a secondary side;
a positive output terminal on which the output voltage is output based on the external signal;
a smoothing capacitor connected between the ground terminal and the positive output terminal, one end of the secondary windings, the smoothing capacitor, and the positive output terminal being connected together;
a first rectification element connected between the ground terminal and a tap of the secondary windings; and
a series circuit of a second rectification element and a second switching element, connected between the ground terminal and the other end of the secondary windings,
the integrated circuit comprising:
an input terminal upon which the external signal is received; and
output terminals coupled to at least the second switching element, the first rectification element and the second rectification element, wherein
the integrated circuit performs synchronous rectification control of the switching power supply by controlling on and off of the second switching element, and the first rectification element or the second rectification element,
the integrated circuit selects whether to keep the second switching element on or off based on the external signal to define a path for rectification of the smoothing capacitor, and
when stopping the output of the output voltage based on the external signal, the integrated circuit, by output signals on the output terminals, turns on the second switching element and controls on and off of the second rectification element according to an adjusted on-duty to adjust a discharge time constant of a residual voltage of the smoothing capacitor so that the residual voltage of the smoothing capacitor is discharged until the residual voltage reaches a predetermined voltage.

4. An integrated circuit for controlling an output voltage of a switching power supply based on an external signal, the power supply comprising:
a direct current rectifier section capable of being coupled to an alternating current power supply;
a transformer including a primary winding and secondary windings magnetically connected to the primary winding;
a first switching element, the primary winding of the transformer and the first switching element being connected to the direct current rectification section in series;
a first control circuit that controls on and off of the first switching element;
a ground terminal on a secondary side;
a positive output terminal on which the output voltage is output based on the external signal;
a smoothing capacitor connected between the ground terminal and the positive output terminal, one end of the secondary windings and the ground terminal being connected together;
a first rectification element connected between the positive output terminal and a tap of the secondary windings; and
a series circuit of a second rectification element and a second switching element, connected between the positive output terminal and the other end of the secondary windings,
the integrated circuit comprising:
an input terminal upon which the external signal is received; and
output terminals coupled to at least the second rectification element and the second switching element, wherein
the integrated circuit performs synchronous rectification control of the switching power supply by controlling on and off of the second rectification element and the second switching element,
the integrated circuit selects whether to keep the second switching element on or off based on the external signal to define a path for rectification of the smoothing capacitor, and
when stopping the output of the output voltage based on the external signal, the integrated circuit, by output signals on the output terminals, turns on the second switching element and controls on and off of the second rectification element according to an adjusted on-duty to adjust a discharge time constant of a residual voltage of the smoothing capacitor so that the residual voltage of the smoothing capacitor is discharged until the residual voltage reaches a predetermined voltage.

5. An integrated circuit for controlling an output voltage of a switching power supply based on an external signal, the power supply comprising:
a direct current rectifier section capable of being coupled to an alternating current power supply;
a transformer including a primary winding and separated secondary windings magnetically connected to the primary winding;
a switching element, the primary winding of the transformer and the switching element being connected to the direct current rectifier section in series; a first control circuit that controls on and off of the switching element
a ground terminal on a secondary side;
a positive output terminal on which the output voltage is output based on the external signal;
a smoothing capacitor connected between the ground terminal and the positive output terminal, one end of a first winding of the secondary windings and the positive output terminal being connected together, one end of a second winding of the secondary windings and the ground terminal being connected together;
a first rectification element connected between the other end of the first winding of the secondary windings and the ground terminal;
a series circuit of a second switching element and a second rectification element connected between the other end of the second winding of the secondary windings and the other end of the first winding of the secondary windings; and
a first switching element connected between the positive output terminal and a connection between the second rectification element and the second switching element,
the integrated circuit comprising:
an input terminal upon which the external signal is received; and
output terminals coupled to at least the first switching element, the second switching element, the first rectification element and the second rectification element, wherein the integrated circuit performs synchronous rectification control of the switching power supply by controlling on and off of the first and second rectification elements and the first and second switching elements, the integrated circuit selects whether to keep the first and second switching elements on or off based on the external signal to define a path for rectification of the smoothing capacitor, and when stopping the output of the output voltage based on the external signal, the integrated circuit, by output signals on the output terminals, turns on the second switching element and controls on and off of the second rectification element according to an adjusted on-duty to adjust a discharge time constant of a residual voltage of the smoothing capacitor so that the residual voltage of the smoothing capacitor is discharged until the residual voltage reaches a predetermined voltage.

6. The integrated circuit according to claim 3, wherein when the output voltage at a time of the stopping the output is more than or equal to the predetermined voltage value, the integrated circuit turns on the second switching element and causes the second rectification element, by at least some of the output signals on the output terminals, to perform switching operation to discharge the voltage of the smoothing capacitor until the voltage of the smoothing capacitor goes below the predetermined voltage value.

7. The integrated circuit according to claim 3, wherein when the output voltage at a time of the stopping the output is more than or equal to the predetermined voltage value, the integrated circuit drives the second rectification element, by one of the output signals on the output terminals, the one of the output signals having an adjusted on-duty to adjust a peak value of current flowing through the second rectification element.

8. The integrated circuit according to claim 4, wherein when the output voltage at a time of the stopping the output is more than or equal to the predetermined voltage value, the integrated circuit turns on the second switching element and causes the second rectification element, by the output signals on the output terminals, to perform switching operation to discharge the voltage of the smoothing capacitor until the voltage of the smoothing capacitor goes below the predetermined voltage value.

9. The integrated circuit according to claim 5, wherein when the output voltage at a time of the stopping the output is more than or equal to the predetermined voltage value, the integrated circuit turns on the second switching element and causes the second rectification element to perform switching operation, by the output signals on the output terminals, to discharge the voltage of the smoothing capacitor until the voltage of the smoothing capacitor goes below the predetermined voltage value.

10. The integrated circuit according to claim 4, wherein when the output voltage at a time of the stopping the output is more than or equal to the predetermined voltage value, the integrated circuit drives the second rectification element, by one of the output signals on the output terminals, the one of the output signals having an adjusted on-duty to adjust a peak value of current flowing through the second rectification element.

11. The integrated circuit according to claim 5, wherein when the output voltage at a time of the stopping the output is more than or equal to the predetermined voltage value, the integrated circuit drives the second rectification element, by one of the output signals on the output terminals, the one of the output signals having an adjusted on-duty to adjust a peak value of current flowing through the second rectification element.

* * * * *